J. P. CLEAL.
CASH REGISTER.
APPLICATION FILED JULY 9, 1910.

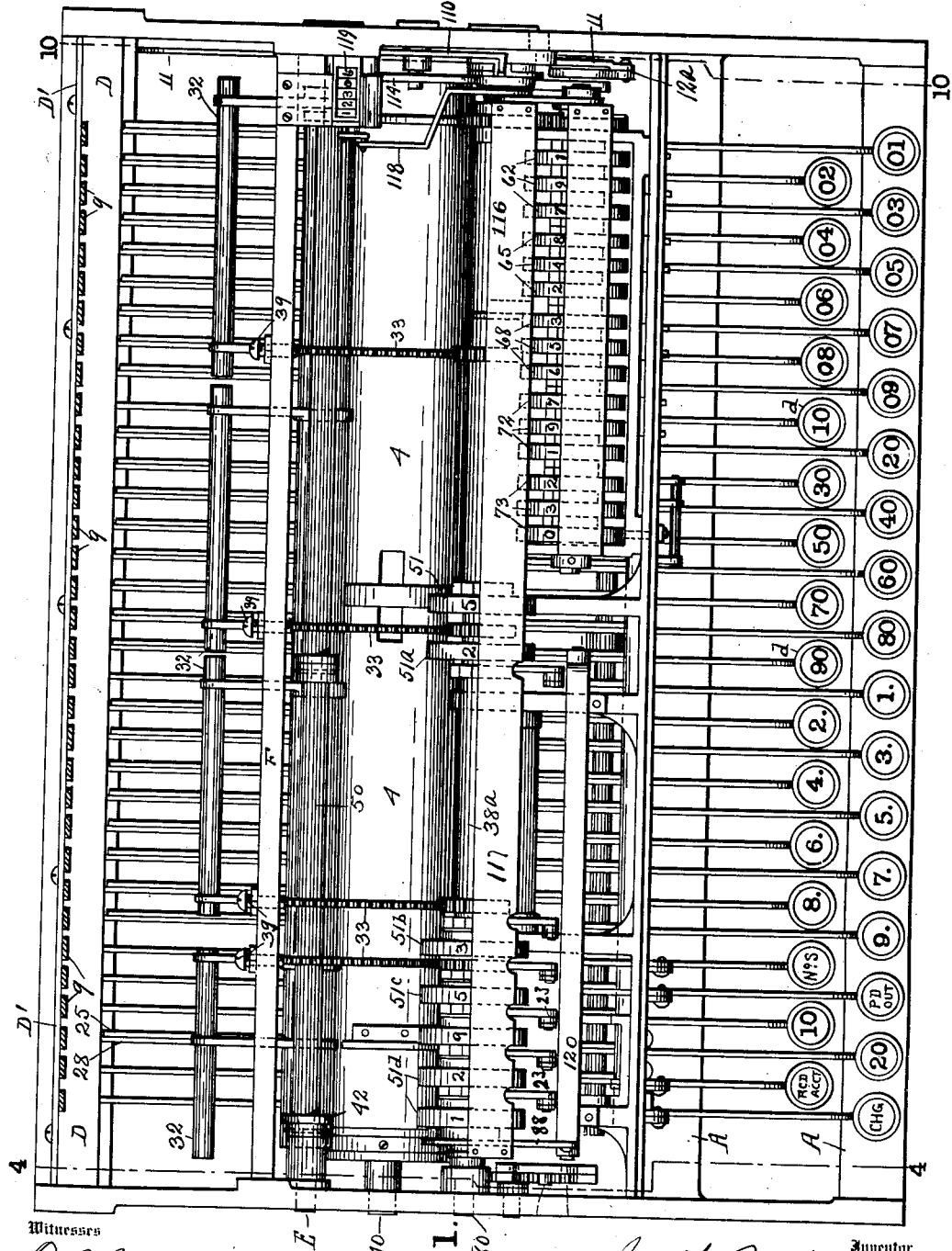

1,154,096.

Patented Sept. 21, 1915.
11 SHEETS—SHEET 2.

Witnesses
Q. B. Baenziger.
C. Jennings

Inventor
Joseph P. Cleal
By Parker & Burton
Attorneys

J. P. CLEAL.
CASH REGISTER.
APPLICATION FILED JULY 9, 1910.

1,154,096.

Patented Sept. 21, 1915.
11 SHEETS—SHEET 3.

Witnesses
O. B. Baenziger.
C. C. Jennings.

Inventor
Joseph P. Cleal
By Parker & Burton
Attorneys

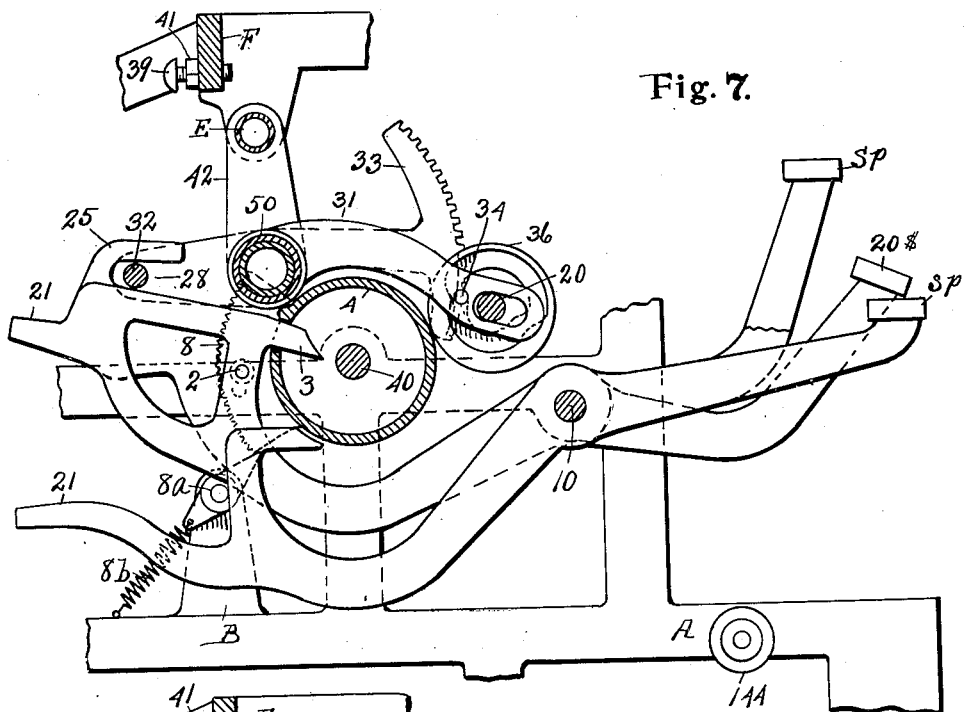
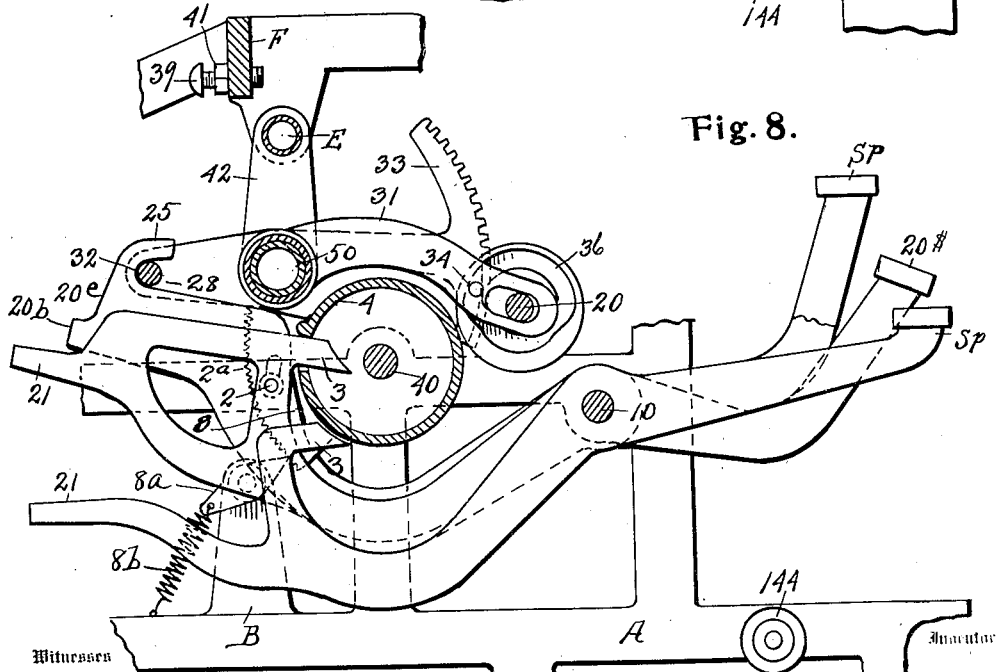

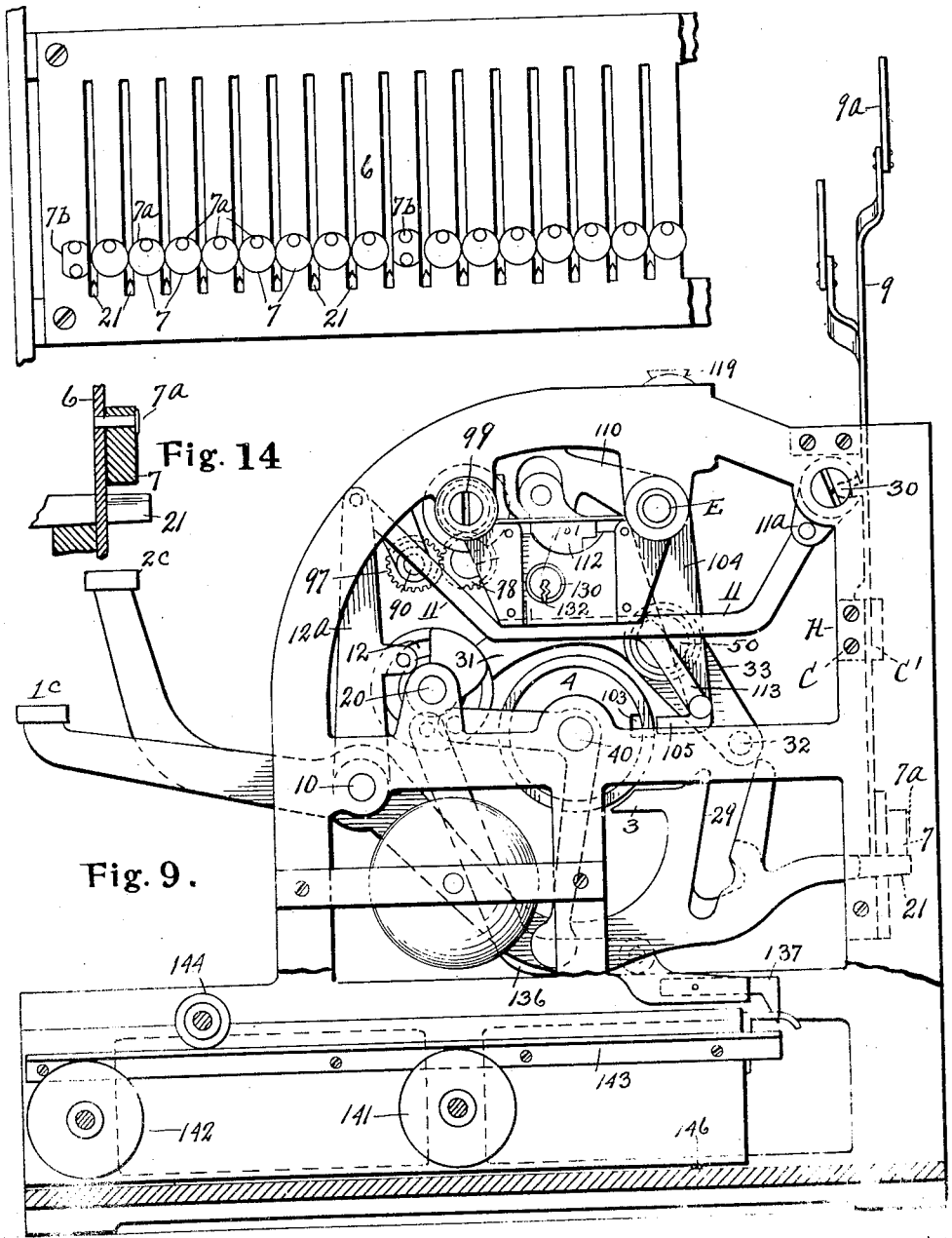

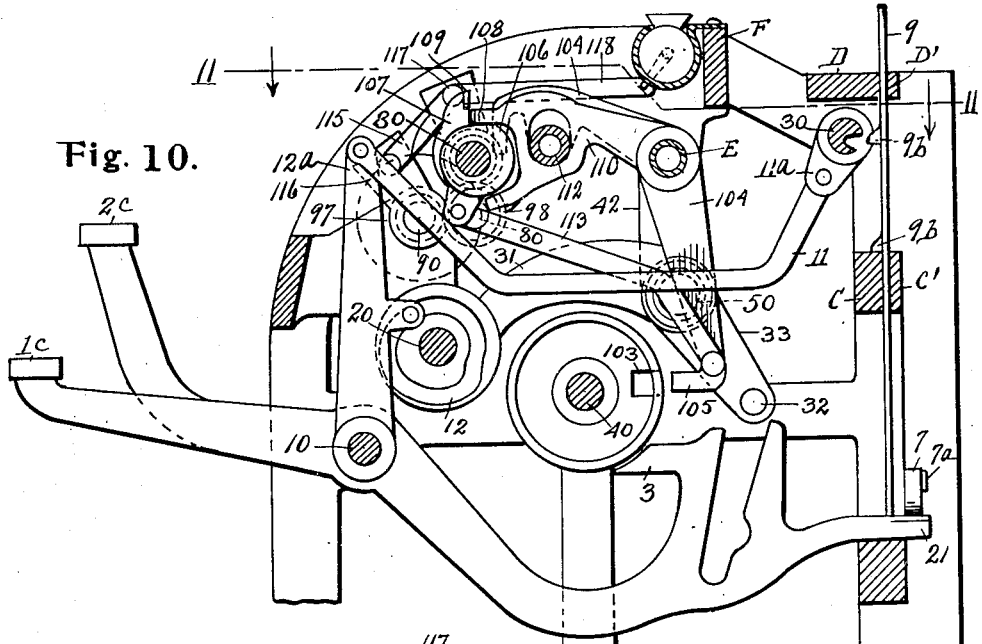
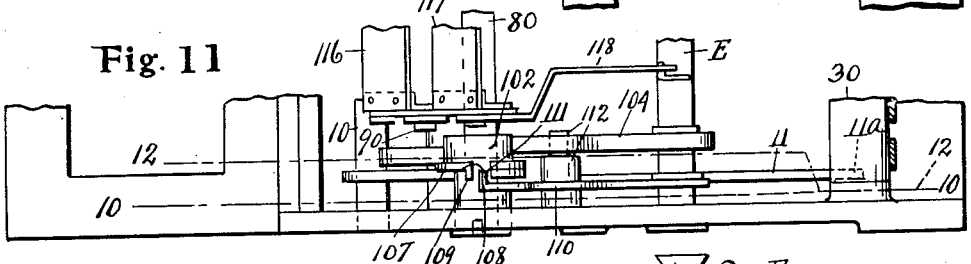
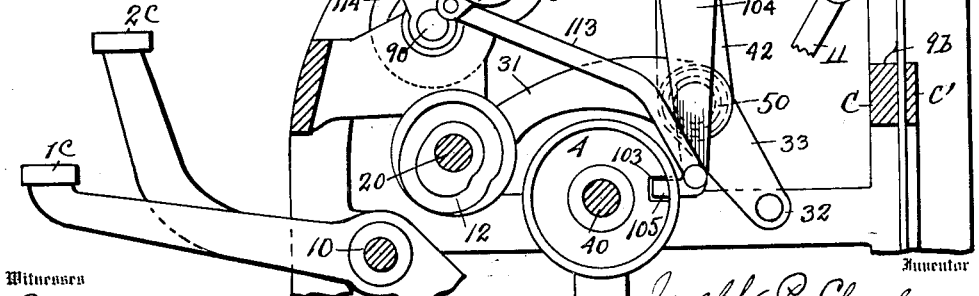

J. P. CLEAL.
CASH REGISTER.
APPLICATION FILED JULY 9, 1910.

1,154,096.

Patented Sept. 21, 1915.
11 SHEETS—SHEET 8.

Witnesses
O. B. Baenziger.
A. C. Jennings.

Inventor
Joseph P. Cleal
By Parker & Burton
Attorneys

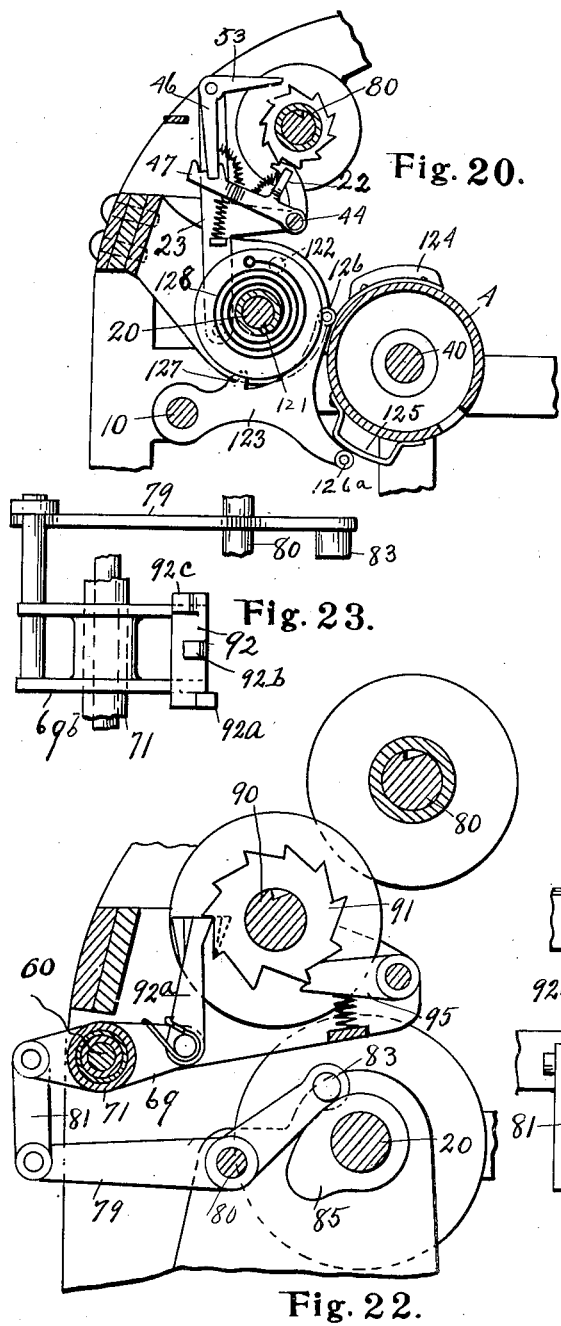

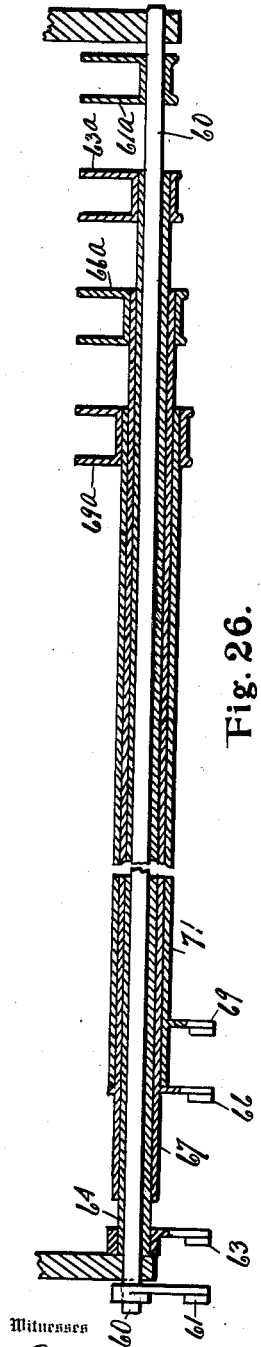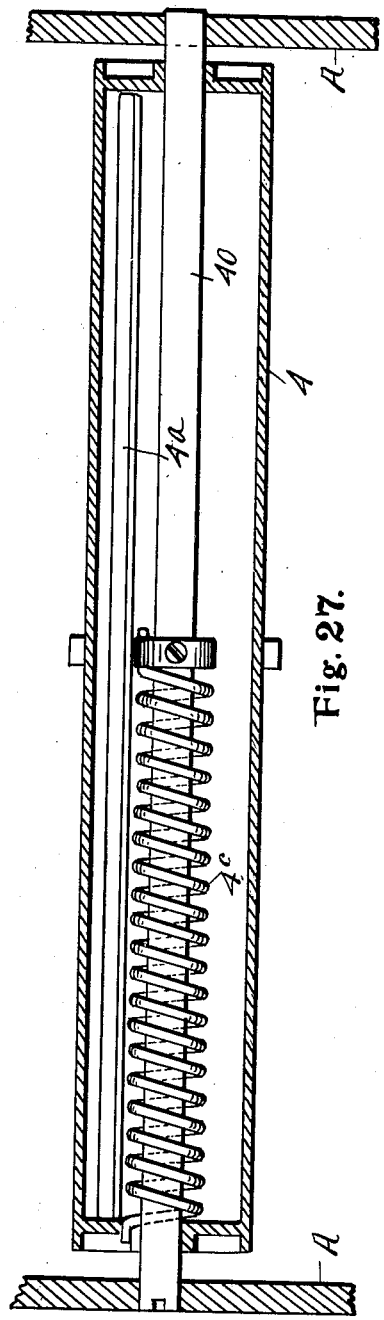

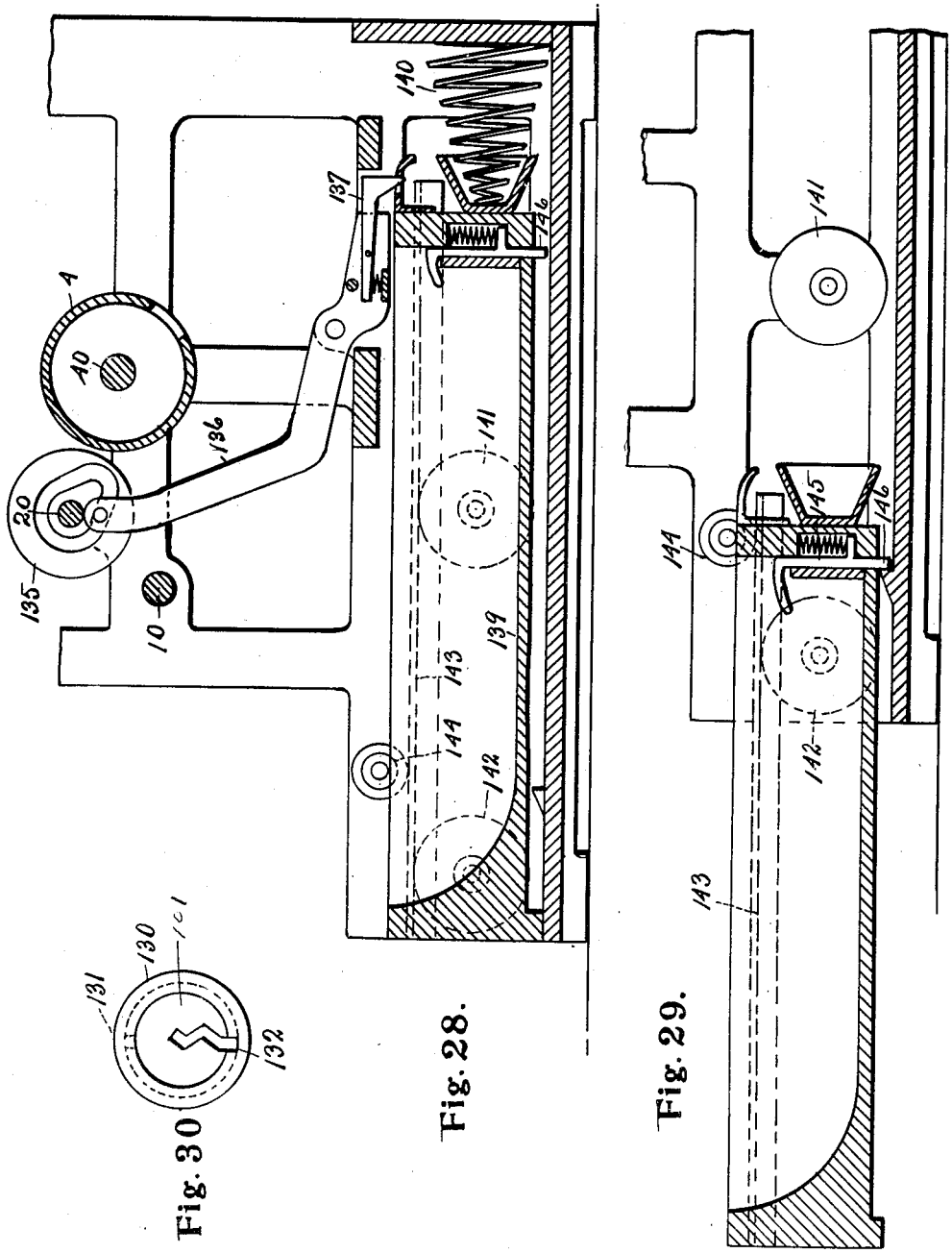

UNITED STATES PATENT OFFICE.

JOSEPH P. CLEAL, OF TORONTO, ONTARIO, CANADA, ASSIGNOR TO MICHIGAN CASH REGISTER COMPANY, OF DETROIT, MICHIGAN.

CASH-REGISTER.

1,154,096.   Specification of Letters Patent.   Patented Sept. 21, 1915.

Application filed July 9, 1910. Serial No. 571,115.

*To all whom it may concern:*

Be it known that I, JOSEPH P. CLEAL, a citizen of the United States, residing at Toronto, county of York, Province of Ontario, Canada, have invented a certain new and useful Improvement in Cash-Registers, and declare the following to be a full, clear, and exact description of the same, such as will enable others skilled in the art to which it pertains to make and use the same, reference being had to the accompanying drawings, which form a part of this specification.

This invention relates to cash registers and has for its object the several improvements as are more fully described in the herein following description.

Figure 3:
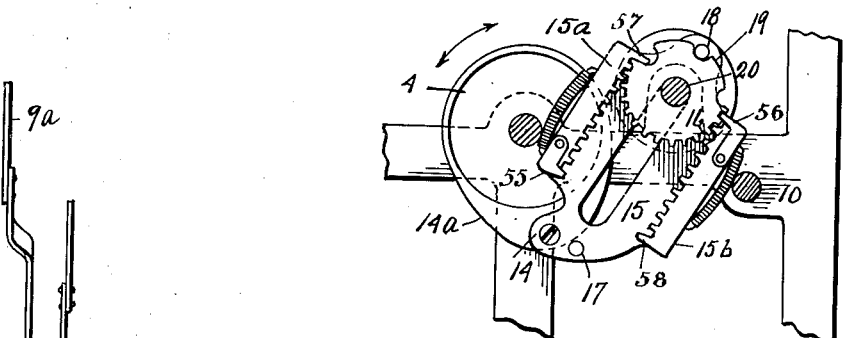
Figure 2:
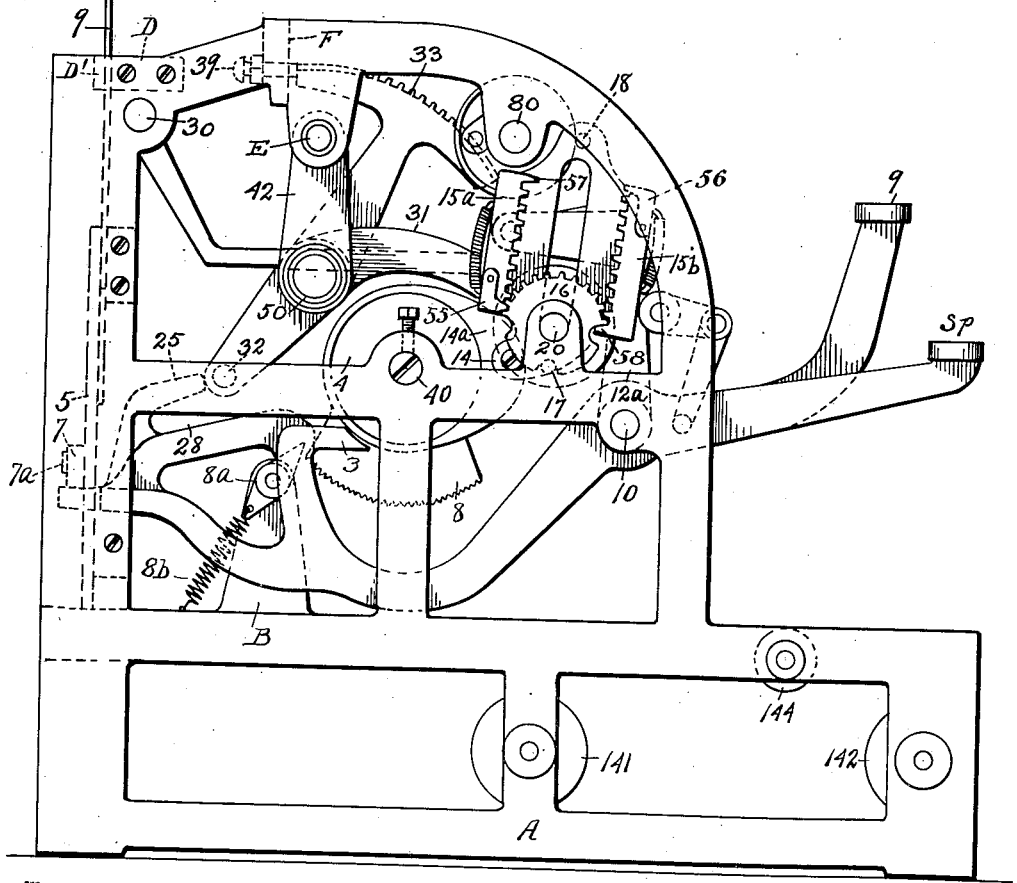
Figures 4, 5:
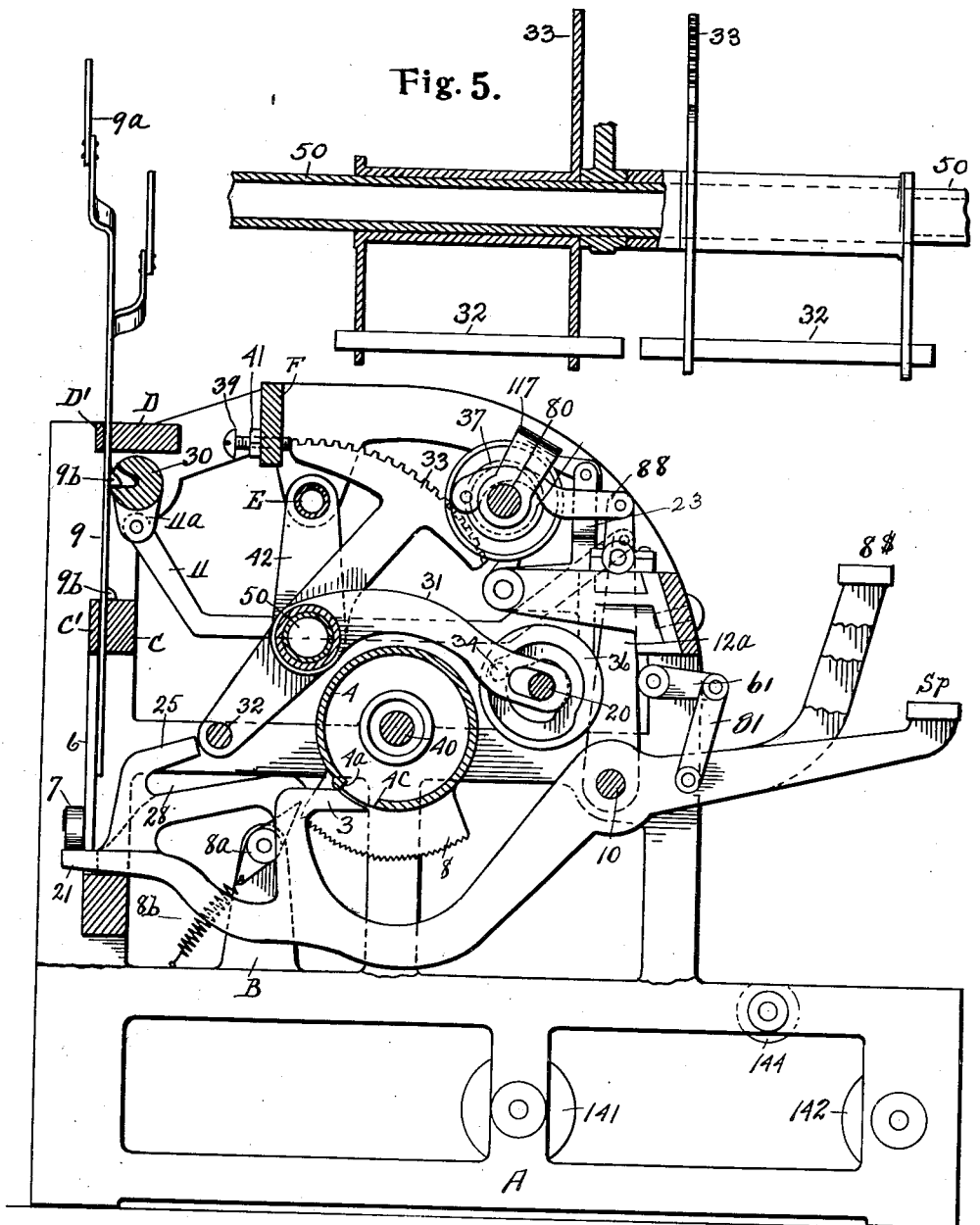
Figure 6:
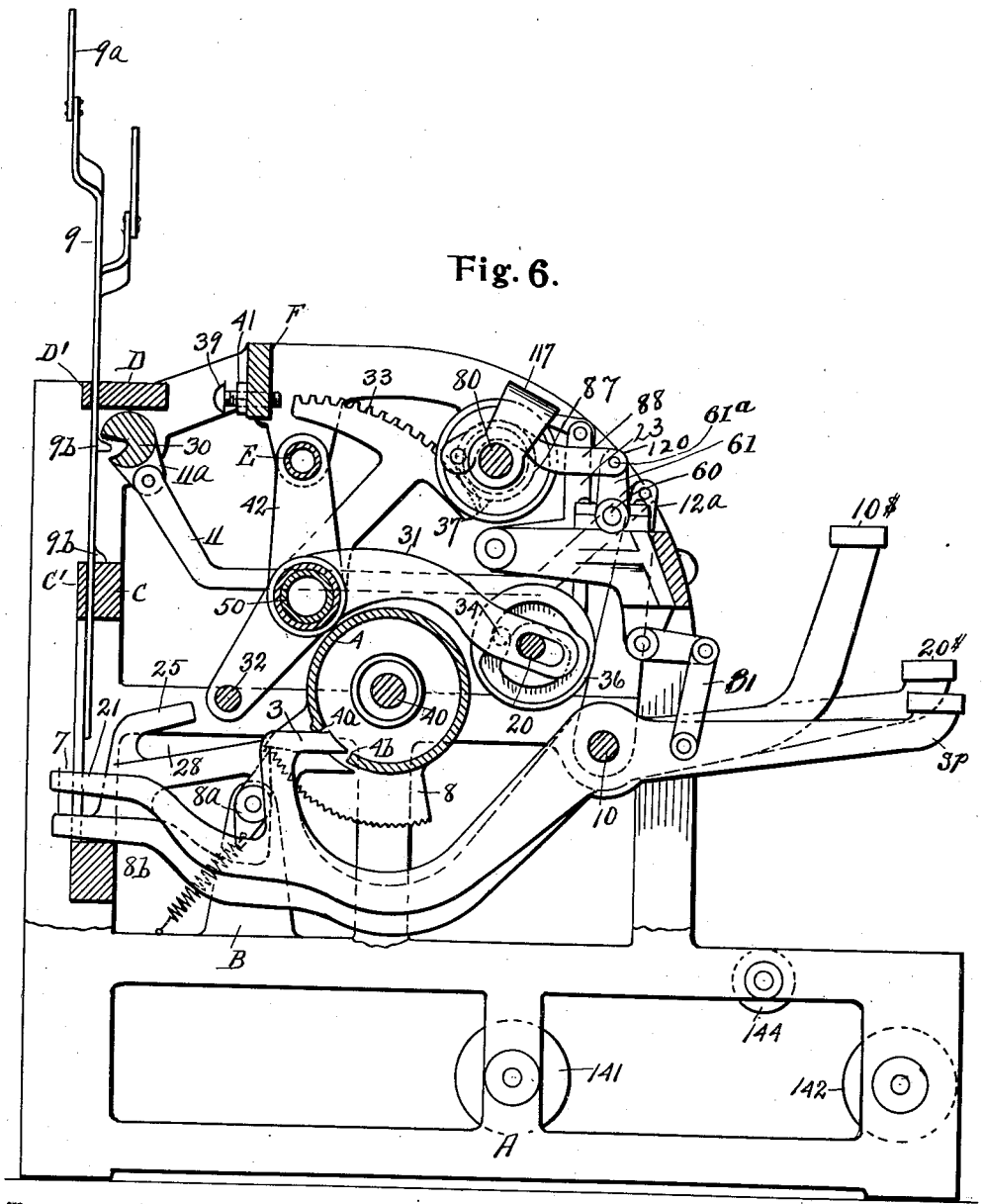
Figure 15:
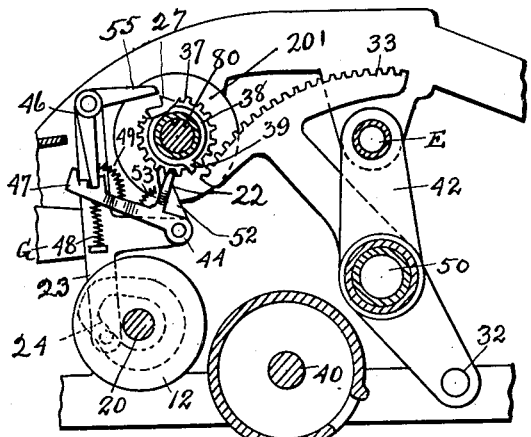
Figure 16:
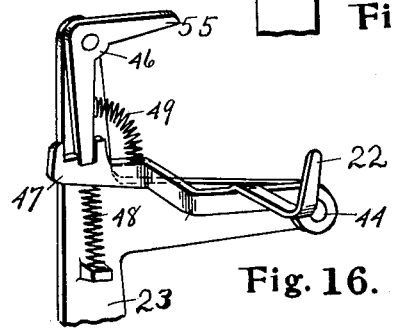
Figure 17:
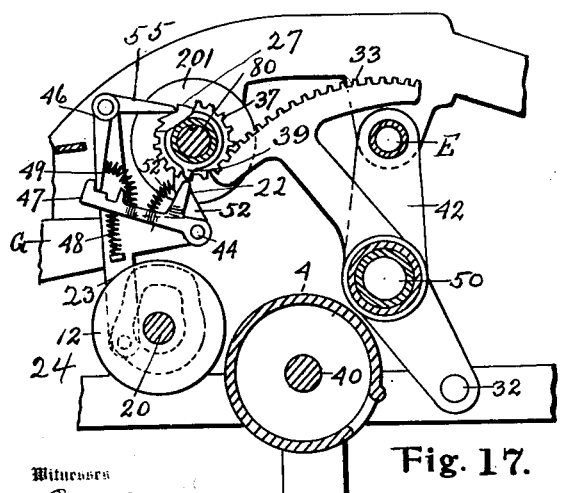
Figure 18:
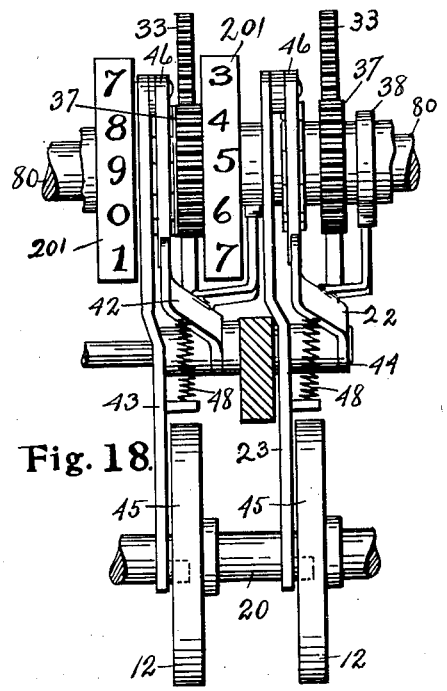
Figure 19:
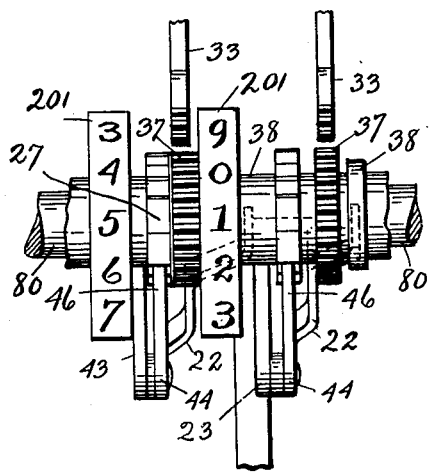

In the drawings: Figure 1, is a plan view of the machine with the case removed. Fig. 2, is an end elevation of the register as seen at the left hand end. Fig. 3, is a detail showing the special means employed to convert the oscillatory motion of the key coupler into rotary movement of the cam shaft. Fig. 4, is a section taken near the left hand end of the machine at the line 4—4 of Fig. 1. Fig. 5, is a detail partly in section of the register actuating rack and the shaft on which it is mounted. Fig. 6, is a section at the left hand end of the register; keys different to those shown in Fig. 4 are here shown, and the parts are shown in a somewhat different position. Fig. 7, is a detail of a part of the mechanism shown in Fig. 6, showing the segmental rack in engagement with the registering pinion. Fig. 8, is a similar view of the same parts showing the segmental rack out of engagement with the registering pinion and illustrating the lag of the companion lever on the return stroke. Fig. 9, is an elevation at the right hand of the register. Fig. 10, is a sectional view at the right hand of the register at the line 10—10 of Fig. 1. Fig. 11, is a plan view of the locking mechanism at the left hand of the register. Fig. 12, is a sectional elevation showing many of the same parts as Fig. 10, and with some of the parts removed. Fig. 13, is an elevation at the back of the machine showing the hanger-stops. Fig. 14, is a cross section of one of the key locking disks, and its support. Fig. 15, is a section showing the action of the register wheel actuating rack and its action on the register wheels. Fig. 16, is a perspective showing in detail of an actuating pawl which is used to effect a carrying operation. Fig. 17, shows the same parts as Fig. 15 differently positioned. Fig. 18, is a front elevation showing two of the series of counter wheels with their accompanying parts. Fig. 19, is a top elevation of the wheels shown in Fig. 18. Fig. 20, is a section showing more particularly the mechanism which effects the carrying to some of the register wheels of higher order. Fig. 21, is a detail section along the shaft 20 of Fig. 20, showing the cam wheels mounted thereon. Fig. 22, is a section across the shaft 90 and 20 showing the mechanism connected with the special register wheels. Fig. 23, is a detail of the pawl that actuates the special register wheels and the crank connections that connect the special register wheels which tally the number of operations of the register with the key coupler. Fig. 24, is a detail of the devices by which the register wheels are picked up in turning to zero. Fig. 25, is a front elevation of a group of special register wheels, and the actuating pawl. Fig. 26, shows the shaft and sleeves by which the special keys connect with the actuating pawls of the special register wheels. Fig. 27, is a longitudinal section of the key coupler. Fig. 28 is a sectional view showing the drawer releasing and ejecting mechanism. Fig. 29 is a view showing the drawer in expelled position. Fig. 30 is a view of the opening for the key that unlocks the turn to zero mechanism.

The register held by a suitable frame and properly incased has keys, the ends of which project through the case, and are provided with character-bearing finger tablets. Within the case is a frame A sustaining a key shaft 10, a cam shaft 20, a shaft 40 upon which is mounted a split tubular oscillating member which has several functions, an indicator supporter 30, a fixed bar E, a segment supporting shaft 50 and other shafts and bars which will be hereinafter described when their use is referred to. The keys are arranged in divisions and there are as many divisions as there are different units of value. In one division, which will be called the first division, are nine keys, each of which is employed to register and to indicate value from 1 to 9 cents inclusive. In the second division are nine keys, each of which is employed to indicate values from 10 cents to 90 cents inclusive. In the third division are nine keys, each of which is employed to indicate values from $1.00 to $9.00 inclusive. In the fourth division there are several keys, most of which are special keys and are used to make indications and registrations of special acts. In this division there may be, and preferably is, two or more keys to indicate values of $10.00, $20,00 and perhaps $30.00. The division of the register is shown on Fig. 1 by the wide spacing between keys at the rear and near ends of the several lock bars 32. The keys are quite similar in construction, although not identical in form, as each key of a division is shaped to produce its own proper indication and therefore differs slightly from the other keys in the division, but an understanding of the construction and action of the entire machine will be evident from an explanation and understanding of a few only of the keys.

In Figs. 7 and 8 the key marked 20$ may be taken as a representative of the value keys, and the key in front of it marked S$p$ is one of the special keys. With each value key is a companion lever pivoted on the same bar 10 and extending to the rear of the bar 10, but not to the front. The key has a rearward extending indicator-lifting point 21; the companion lever lacks the indicator-lifting extension but has a short extension 20$^b$ which contacts a stroke limit bar C on the rear of the frame. The companion levers need not be used with the lowest value key of each division, as a deep notch 29 or rather high walls at the contact point prevents overthrow. (See one cent key Fig. 9). A pin 2 projects from the side of the main key 20$ and engages through a slot 2$^a$ in the companion lever 20$^c$; the slot allows the companion lever to lag behind the main key on the return stroke; the two rise together. This results in holding the rack 33 from beginning its return oscillation until after the key has made enough of its return stroke to disconnect the rack and pinion. The key 20$ is provided with a forward extending projection 3 that engages through a slot in the walls of an oscillating part-cylinder 4 on shaft 40; this part-cylinder performs the function of a key coupler to couple and compel the contemporaneous action of the keys of different divisions and also acts as a key stop to prevent the subsequent action of any other keys than those which have been engaged to the coupler, requiring all coupled keys to perform their full action, and return to their normal position, in which normal position they are entirely out of engagement with the coupler 4.

The placing of the projection upon the key and the slot for the reception of the key projection on the key coupler is a distinct improvement over registers heretofore constructed. The projection 3 is on the rear arm of the key and the least oscillation of the key moves the projection, which lies directly in front of the slot, across the circle of travel of the coupler. The tubular form of the key-coupler allows the projections 3 to lie very close to the coupler so that when one is actuated it may enter the slot and start the key coupler in a minimum period. As soon as the key coupler is started the edge 4$^c$ comes up above the beveled face of the projection 3 so as to lock out any other keys that may be subsequently actuated. The simultaneous pressing of more than two keys from one bank is prevented by the hanger stops 7 (shown in Fig. 13 and described in the next paragraph) on the back of the machine. The quick lock-out effected by my slotted key coupler and projection on the key arrangement makes the use of these disks instead of the long hangers possible, as it is necessary for the disk hangers to function only at the very beginning of the oscillation of the key coupler. In the key couplers of the prior art the key has been obliged to travel some little distance before it would actuate the key coupler to make it act as a lock-out for the other keys, and it has often been possible to snap in a key from the same bank, causing, of course, serious trouble in registering, as keys from the same bank lock into the same registering mechanism but are calculated to move it different distances. Another advantage of the tubular form of key coupler is that it makes a coupler that it is impossible to bend even slightly from end to end. With the couplers in general use it has been possible to start two keys located at opposite ends of the machine and continue to press them until the revolution rack (hereinafter to be described) is about to trip, then one of the keys can be forced to continue its movement while the other key is forced back; this springs the key coupler and forces one end of it so as to cause the revolution rack to convert the oscillatory movement into a full rotary movement of the cam shaft; but the key at the opposite end of the machine has been prevented from going its prescribed distance and hence has not completely registered so that an amount can be held out. Still another advantage in this form of key coupler is that the point of contact of the key in actuating the key coupler is brought closer to the center of motion of the key coupler itself, which makes an easier working device and the key coupler less liable to rebound.

The rear extensions of all keys of the register engage through a grid-like member which extends along the register at the rear and is provided with vertical bars 6, as seen in Fig. 13; the bars 6 serve as guides for the rear of the keys and sustain the key stops which consist of hanging disks 7, each of which is capable of a short oscillation on its supporting pin 7ᵃ, except, however, a disk 7ᵇ at each end of a division (of 9 keys). The disk 7ᵇ is made fast and is cut away until its vertical edges correspond with the vertical edges of the grid-bars 6, and it now serves to limit the oscillation of the stops 7. Each of the hanging and oscillating disks 7 overhangs the edges of the bar to which it is secured and touches the adjacent hanger at either side. In an entire division there is a space between the fixed blocks which is greater than the added width of the hangers by the thickness of one key. The end 21 of the key 20$ (or the similar end of any key, either special key or value key), projects through the grid and in its normal position rests at the bottom of the grid below the key stop 7ᵃ. As soon as any one of the keys is actuated to lift the rear end thereof sufficiently high to contact the disk above it, the two disks, one at each side, swing to permit the key to pass through between the two disks, and when any key is in a position to fully contact the two disks of these two guide bars, the entire space between the fixed blocks 7ᵇ is filled, and while the key is in this position no other key can be actuated. As soon as the key passes above this position the key coupler stop comes into action and prevents any other key of the entire register from being actuated. Thus, there may be coupled together and actuated together any combination of keys, provided only there is in such combination only one key from each division.

The spring 4ᶜ (Fig. 27) put into tension by the action of the key serves to throw the keys back to their normal position, as soon as they have made their complete throw and are in a condition to return. The complete throw of the keys is insured by means of a toothed rack 8 secured to the key coupler 4 which engages with a tumble-over pawl 8ᵃ and compels the full oscillation of the member 4 in either direction before it can start on its return motion. The pawl 8ᵃ is pivoted to any suitable part of the frame as to post B, and is held with its point in proper position to engage the rack 8 by a light spring 8ᵇ.

The rear extension 21 of the key extends through the guide and projects under the vertical indicator rod 9 of the indicator 9ᵃ. The rod 9 is provided with a claw 9ᵇ that normally rests on the cross bar C of the frame, and holds the indicator rod with its lower end raised some distance above the end 21 of the key. The indicator rod is guided between the bar C and a holder C¹ and a similar bar D with holder D¹ which crosses the frame above it; the confining bars C¹ and D¹ hold the rod to the frame but permit it to slide freely in a vertical direction. Above the frame member C and below the frame member D across the frame, extends the indicator supporter, a grooved cylindrical bar 30, or a slotted tube which normally occupies a position seen in Fig. 4 with the groove lying in such relation that the claws 9ᵇ engage in it, and those of the tablet rods that have been lifted are sustained thereby. The indicator supporter 30 is oscillated by crank extension 11ᵃ from which a link 11 extends to near the front of the frame; the link is driven by a rotating cam 12 (seen in Figs. 9 and 10); the link 11 connects directly to a standard lever arm 12ᵃ pivoted on the key shaft 10 upon which the key levers are hung. The cam 12 is timed to oscillate the indicator supporter 30 properly to catch the claws of the lifted indicator rods in the groove at the moment they have received their complete lifting actuation. It is also timed to rock the indicator supporter in the opposite direction to drop the lifted indicator rods shortly after the subsequently actuated key has commenced to lift its proper indicator rod, so that there is a period of time intervening after the previously lifted indicator rod drops before the presently rising indicator rod reaches its elevated position and is caught in its elevated position, the time intervening depending upon the shape given to the race in the cam 12.

The cam 12 is on the cam shaft 20 which extends from end to end of the case and is driven in revolution by mechanism shown in Fig. 2. On the end of the key coupler 4, is a collar 14ᵃ which carries a crank pin 14 (seen in Fig. 2). This pin is located outside of the general surface of the key coupler 4 on the collar 14ᵃ which projects beyond the surface and at the end of the key coupler 4 and connects with a double rack member 15 provided with two racks 15ᵃ and 15ᵇ, one at each side of the slot which extends longitudinally along the member. A mutilated pinion 16 mounted on the cam shaft 20 engages the racks 15ᵃ and 15ᵇ; the regularly toothed part of the pinion engages the rack 15ᵃ on the down stroke of the key which turns the key coupler 4 in the direction of the arrow shown in Fig. 3. The same regularly toothed part of the pinion engages the rack 15ᵇ on the up stroke. At each end of the rack member is a pin (17 at the bottom end, and 18 at the top end), which pins engage in a notch 19 in the pinion at the time the one rack leaves the pinion and the other engages with it. The reciprocation of the double rack 15 revolves the pinion 16 continuously in one direction, and as the cam shaft 20 is fixed to the center of the pinion it is revolved always in the same direction and is given a full rotary movement for each oscillation and return oscillation of the key coupler.

The value of the key actuated is transferred to register wheels by a mechanism which is repeated in the several divisions and in each division each key is special and arranged to actuate a driving rack through an arc limited to the special value of the key; that is, the one cent key will actuate the rack which drives the register wheels a definite distance; the two cent key will drive it twice as far and the three cent key three times as far. This is effected by bringing the actuating part of the key lever into actuating contact with the parts connected intimately with the driving rack at a period corresponding to the value of the key. If the value of the key be high the contact is made quickly; if the value of the key be low the contact is made at a later period and the contact continues through a shorter duration. This will be understood by a comparison of Figs. 2 and 9. In Fig. 2 is shown a key having value 9, and at the rear end of this key the companion lever is shown with a hook 25; the key has a cam face 28 which is an integral part of the key and which engages under and lifts a lock bar 32 that is a common bar actuated by the keys of a division and rocks the segmental rack 33. The rock arm which carries the lock bar is mounted on a segment-supporting shaft 50; this shaft 50 is itself suspended by hangers 42 from a fixed bar E of the frame. During periods of rest when the keys are all in normal position with their finger terminals lifted, the segment-supporting shaft 50 hangs with the racks 33, (of which there is one for each division of the register) out of mesh with the register pinions. In coming into mesh with the register pinions the lock bar changes axes of swinging, a link 31 extends from the segment-supporting shaft 50 forward and engages with a cam 36 mounted on the shaft 20 which has a full revolution at each complete stroke of the key. A pin 34 projects from the link 31 into the race of cam 36 and the race and pin are timed to draw the segment-supporting shaft 50 forward immediately after the beginning of the stroke of the key and this brings the segmental rack 33 into engagement with the register pinion 37. Subsequent movement of the key lifts the lock bar 32 and oscillates the segmental rack 33 giving to the rack such a degree of oscillation as is given to the lock bar 32, which itself depends on the amount of such motion after the contact or cam face 28 of the key strikes it. Each of the companion levers of a key is provided with a hook 25 which engages over the lock bar 32 during all of its register actuating stroke and prevents overthrow. The one cent key and the special keys have no companion lever. The one cent key (as shown in Fig. 10) is provided with a deep notch 29 which widens to permit the disengagement of the segmental rack 33 and pinion 37 as will be explained. The character of the slot used in the one cent key (also the one dime key and the 1$ key, and the 10$ key) is such as to prevent any possible overthrow, and a companion lever is not used in connection with it or with the unit keys of any order.

Adjustment of the initial position for the segmental rack 33 is made by means of an adjusting screw 39 that engages through the frame bar F and is held in adjustment by jam nut 41. The link or pitman 31 actuated by the cam 36 fixed to the cam shaft 20 draws the segment-supporting shaft 50 forward and brings the segmental rack 33 into engagement with the register pinion 37 and the segmental rack 33 being oscillated to a degree which corresponds with the value of the key that is actuated rotates the pinion 37 correspondingly. The pinion 37 is mounted on a counter-supporting shaft 80 and carries on its hub a ratchet wheel 27 and on the same hub is the counter wheel 201. During the pressure stroke of the finger on the key the segmental rack 33 is swung forward so as to change axes of swinging and brought into engagement with the pinion, and the oscillation continued until the full value of the key is registered on the counter wheel 201. At the beginning of the return stroke the cam 36 is positioned to first of all disengage the segmental rack 33 and the pinion 37 by producing a back-ward swing of the hangers of the segmental-supporting shaft 50, and neither the pinion, the ratchet wheel, nor the counter wheel makes any return movement during the return stroke of the key, they being held by a retaining pawl 52 that engages the teeth of the ratchet wheel.

With the counter wheels primarily actuated by the rack 33 are associated wheels of higher order onto which carrying is effected. There is first a counter wheel actuated by nine keys of the lower or cent order. Carrying is effected from this counter wheel to the counter wheel which is actuated by the keys of the dime order, which not only acts as a secondary wheel for the first counter wheel, but acts as a primary wheel for its own registration. This is followed by the wheel of the third order, which also acts as a primary wheel for the units of the third order and is actuated at the proper time by the wheel of the next lower or dime order, and following this are a number of wheels which carry the totals to any amount desired. The carrying is accomplished properly, although several keys of different divisions have been coupled and each has acted on its own register during the down stroke. On Fig. 1 the counter wheel of the first order is indicated at 51. This is actuated by any one of the keys in the first division between one cent and nine cents inclusive. Carrying is effected from this wheel to wheel 51$^a$; the wheel 51$^a$ is also actuated by any one of the keys $d^{10}$ to $d^{00}$ inclusive. Carrying is effected from the wheel $51^a$ to wheel $51^b$ and as the action of the keys is continued the sum of the values is carried onto wheels $51^c$ and thence on to wheels $51^d$, which are not primary wheels. The wheels 51, $51^a$, $51^b$, and $51^c$, are all of them primary wheels, and the wheels $51^a$ and $51^b$ and $51^c$ are secondary wheels as well as primary. The means by which the carrying is accomplished will be best understood by an examination of the Figs. 15 to 19 inclusive. Connected with the pinion 37 is a single tooth wheel. This is shown on the drawing as made on a collar 38 with a single tooth 39 and in close proximity to the pinion 37. With some of the wheels, as with the wheel $51^a$, it is spaced by a long collar $38^a$ from the wheel, but its action is the same whether it be in close relation or in a more distant relation therewith. The long tooth revolves with the pinion and once in each revolution trips an arm of the stepped pawl that is pivotally connected by the rod 44 to a fixed point of the frame as the bracket G which extends in from the main body of the frame. On the same pivot with the stepped pawl 22 is a transfer lever 23. The transfer lever 23 is a compound structure consisting of a T shaped body, the stem of which is pivoted by the rod 44 to the bracket G. One branch 24 of the transfer levers 23 is provided with a pin that engages in a cam race in the cam 45 on the cam shaft 20, which cam rotates once at each stroke of any key. The free end of the transfer lever carries a transfer pawl 46 pivoted to it; the engaging end of the transfer pawl normally lies in close proximity to the ratchet wheel 27; the pawl 46 is an actuating pawl which at times actuates the ratchet wheel 27 and at other times oscillates without actuating the ratchet wheel. Its actuating action is accomplished by its position with respect to the upper branch of transfer lever 23; this position is determined by the stepped pawl. The free end of the stepped pawl is provided with a stepped catch 47, on either step of which the end of the pawl 46 may engage. The step of the pawl 47 is pressed against the hanging end of the transfer pawl 46 by a compression spring 48 and the end of the transfer pawl 46 is pressed outward by an expansion spring 49. A retaining pawl 52 pressed by spring 53 against the ratchet wheel 27 is pivoted on the same rod 44 with the stepped pawl 22. As the pinion 37 revolves, actuated by the segmental rack 33 once in each revolution, the single tooth engages arm 22 and depresses the stepped end of the stepped pawl. Immediately upon the depression the depending end of the transfer pawl 46 flies onto the upper step and the two are now in comparatively rigid connection with the end 35 of the transfer pawl 46 held down in position to engage the tooth of the ratchet wheel 27. The revolution of the cam shaft 20 which takes place with each actuation of the key now swings the end 24 of the transfer lever 23 bringing the upper end and the transfer pawl 46 toward the ratchet wheel and actuating the ratchet wheel by the contact which now takes place between the transfer pawl and the ratchet wheel. This actuating movement of the transfer levers is effected at different times after the segmental racks have withdrawn from the pinions and occurs with respect to each lever after the transfer pawl has been set. The setting and actuation of each transfer lever is timed to take place after the setting and actuation of the one of next lower order.

The cam disks which actuate the last three wheels, to the left in Fig. 3, which are all secondary and never primary, are fixed on a sleeve which is on the shaft 20 and capable of revolution independently of the cam shaft 20, but compelled by the mechanism about to be described to revolve intermittently therewith, making a full revolution for each full revolution of the shaft, but making the latter part of the revolution rapidly and after the shaft itself has ceased to revolve. This is necessary to allow all the transfer pawls to be set and actuated progressively which could not be done in the part of the revolution of the cam shaft which remains to do this work. In order to provide motion after the cam shaft has ceased to revolve the cam disks are fixed on this sleeve 121 and one of the disks is provided with a pin 122 extending from the side which is contacted by a pawl 123 pivotally secured to the key shaft 10 and actuated in both directions positively by cam projections 124 and 125 on the key coupler 4. During a part of the oscillation of the key coupler 4 the cam projections engage the ends of the pawl 123, which ends are provided with anti-friction rollers 126 and $126^a$ and the stop 127 on the pawl is swung into the path of the pin 122. A spring 128, one end of which is secured to one of the disks, and the other end of which is secured to the cam shaft 20, is wound or put under tension by the part of the revolution of the shaft after the pin 122 has contacted the stop 127 and the cam disk temporarily stops. On the return oscillation of the key coupler 4 the stop is swung out of the path of the pin 122 and the spring completes the revolution of the cam disk and completes the carrying movement of all the pawls of these three wheels, bringing them all into action progressively. The progressive action is due to the lead of one cam over another.

In addition to the registers indicating the values of the keys there is a special register for the special keys, including in these special registers one set of register wheels which indicates the number of times that the machine itself has been operated, making a registration for the depression of any and every key each time it is actuated, and registration for each of the special keys indicating the number of special operations that the user of the machine has performed. The special keys are all located at the left-hand end of the machine, and the special register wheels are located in groups, one group for each special feature at the right-hand end of the machine and in order that the operation may be transferred from the left to the right, the shaft of the primary register wheel for the special key at the extreme left is used as a basis shaft which will be designated as the special register wheel shaft and upon this is sleeved a hollow shaft which connects the second special key from the left end with a group of wheels that is placed in the second position from the right end. The sleeve supporting shaft 60 is actuated by crank 61 which is linked to one of the special keys, as for instance, the special key at the extreme left indicated on Fig. 1 as "Chg" and this actuates the crank 61ª and primary wheel of the primary set 62 of the special tally wheels. The crank 63 on hollow shaft 64 actuates a crank 63ª on the opposite end of the shaft 64 and actuates the primary wheel of the second special tally set 65 on the register. The crank 66 on hollow shaft 67 actuates the crank arm 66ª on the opposite end of this shaft and this actuates the primary wheel of the third special tally set 68 on the machine. The crank 69 on the hollow shaft 71 actuates a crank 69ª, and the primary wheel of set 73 of the fourth special tally set, these four special key connections and four special tally groups being sufficient for a machine of ordinary size. The location of the several tally sets is shown on Fig. 1, the through connection from the special keys is shown on Fig. 26.

The set 73, which may be called the customers tally set, is actuated with every action of any key of the entire machine by a pitman shown in Fig. 22 and in Fig. 25, and it is thought that an understanding of the workings of all of these special tally troups will be understood from an explanation of the group shown in Figs. 22, 23 and 25, in which, except that the initial actuation is from different sources, is found a representation of all of these tally groups. Considering the rock lever 79 as substituted for the key the subsequent mechanism of each group is alike in all respects. In the one case the link 81, (Figs. 4 and 6) is connected to and actuated by a key, and in the other case it is connected to and actuated by a rock lever 79 (Fig. 22) which is rocked by a cam 85 on the shaft 20 that revolves with each actuation of the key. The lever 79 is pivotally supported on shaft 180 and is provided with an anti-friction wheel 83 which engages against the cam 85 which rocks the pawl lever 69ª with each revolution of the wheel just as in connection with the other special groups the lever corresponding to pawl lever 69ª is rocked directly by the key. This customers group of tally wheels is at about the middle of the machine and the lever 69ª is pivoted on the outside of the sleeve 71 shown in Fig. 26. On the special register wheel shaft 90 is a ratchet wheel 91 which is actuated by a compound pawl 92, the pawl 92 having three fingers 92ª, 92ᵇ and 92ᶜ, which engage with three consecutive ratchet wheels on the shaft 90 and utilizing what is well known as the deep notch method of carrying from the primary to the second and third wheels. The deep notch system of carrying, being in such common use and so well known, it is not thought necessary to enter into a careful description of it beyond the mere statement that the pawls are actuated by a primary lever 69ᵇ and the wheels are held against reverse motion by a holding pawl 95.

The resetting mechanism is similar in both register systems. For resetting purposes the register wheels strung on either shaft, as for example, each wheel strung on counter wheel shaft 80 is provided with a pawl that engages through the opening 94 in the hub and engages in a notch or long slot 96 in the shaft. This allows the counters to be picked up when the shaft upon which they are located revolves. All special or tally groups are on the special register wheel shaft 90; the value indicators are on the counter wheel shaft 80. The special register wheel shaft 90 provided with a gear wheel 97 is connected to the counter wheel shaft 80 of the total adding group of wheels by an idler 98 and turned therefrom by the key which is inserted in a key-hole 99 in the end of the counter wheel shaft 80. The counter wheel shaft 80 cannot be turned until it has been released from the restraint of a stop 106 which is actuated by the bolt of a lock similar to a "Yale" lock. The key inserted in key-hole 99 cannot actuate the counter wheel shaft 80 until another key has been previously inserted in the lock 101 and shot the bolt there and at the same time raised a flash from off the groups of special register wheels and off the groups of total adder wheels. The flash cannot be lifted without first actuating the bolt of the lock 101 and after the flash has been lifted the bolt of the lock 101 cannot be retracted or the key taken out until the register wheels have been set to zero. Preferably, two keys are used, the key in 101 being caught after it has been used to shoot the bolt and raise the flash and not being removable therefrom until the resetting has been accomplished, and the flash returned to its concealing position, after which the key may be removed from lock 101.

On the counter wheel shaft 80 is a segmental disk 102. In the key coupler 4 is a notch 103 and an angled rock arm 104 provided with terminals, one of which 105 engages in the notch 103, and the other of which 106 engages in front of the flat face of the disk 102, and prevents the simultaneous rotation or oscillation of both. When in the position shown in Fig. 10 the counter wheel shaft 80 is locked against revolution, and the machine is in condition for its regular use. When in the position shown in Fig. 12 the use of the machine is stopped temporarily and the counter wheel shaft 80 can now be turned while the point 105 of the lever 104 is engaged with the key coupler 4 and now prevents the oscillation of that member, whereas the point 106 has been lifted from in front of the flat face of the disk 102, and the shaft 80 with the disk upon it and the shaft 90 can be rotated for resetting purposes; both of these are adapted to catch the register wheels mounted upon them at the proper point and rotate them forward to zero. On the counter wheel shaft 80 is also a cam disk 107 with a notch 108 and a stop 109 and a lever 110 is pivoted on the fixed bar E. By examining Fig. 11 it will be seen that the cam 107 is highest at 109 (its height being shown in Fig. 10) and that its diameter lessens as the eye travels around the cam counter-clockwise but as the eye nears the projection 109 it is seen (Fig. 10) that the periphery of the cam is farther from the center of the shaft 80 and as it approaches the projection 109 it is about on the same plane as the lower edge of the projection 109. But just before the projection 109 is reached the surface of the cam drops abruptly forming a notch indicated as 108 (Fig. 11). The lever 110 carries a laterally projecting point 111 and the cam carries a laterally projecting point 109 which both project into a common plane perpendicular to the axis of the shaft 80. Hence when the projection 111 rides on the cam in the resetting operation it is thrown against the projection 109 and the resetting temporarily stopped until the projection 111 has had time to drop into the notch 108 and under the projection 109.

The bolt 112 of the lock 101 lifts the end 106 of the rock arm 104 out of its position in front of the flat face of the disk 102 and simultaneously interlocks the point 105 with the member 4. Simultaneously with this movement a link 113 that extends from the 105 end of the arm 104 engages a rock arm 114 which swings on the counter wheel shaft 80, and which is in parallel bar arrangement with a link 115 that controls the two flash aprons 116 and 117; from the flash apron 117 a link 118 extends to an ordinary counter 119 upon which it registers the number of times the flash has been operated. The flash bar 117 is continuous across the case and is the flash bar of the counter wheels. The flash bar 116 serves to cover the special tally wheels.

A cam 87 on the counter wheel shaft 80 on the left end thereof actuates a link 88 to draw a bar 120 against the transfer pawls 46. If this were not provided, the result would be that the lower end of the carrying pawl 46, would be held so that the stepped pawl 47 would resume its "set" position after it has been forced down by the tooth 39 contacting the arm 22 as the counter unit is revolved to turn to zero, and all the carrying pawls would be tripped and would carry "one" on each succeeding counter wheel.

What I claim is:—

1. In a cash register, the combination of a register pinion, a lock bar and segmental rack suspended to swing on anyone of a plurality of axes, a key adapted to cause them to change axes, to throw the rack into or out of engagement with the pinion and a companion lever coupled to said key with a pin and slot connection to provide lost motion, the said companion lever being adapted to delay actuation of the lock bar and segmental rack until the said key has caused a change of the axis of swinging, substantially as described.

2. In a cash register, the combination of a register pinion, a lock bar and segmental rack suspended to swing on anyone of several axes, so that the rack will be in mesh or out of mesh with the pinion, a key adapted to swing the lock bar and to cause a change of axes, and a companion lever adapted to engage against the lock bar, the said companion lever having a lost motion coupling to said key and adapted to delay the swinging of the lock bar until the axis of rotation has been changed, substantially as described.

3. In a cash register, the combination of a registering pinion, a rack or member adapted to actuate the same, a key, a companion lever having a lost motion coupling therewith, the two latter being adapted by reason of said lost motion coupling to communicate and allow actuation of said rack or member on the return stroke of the key only after its disengagement from the registering pinion, and means for engaging or disengaging the rack or member from the registering pinion, substantially as described.

4. In a cash register, the combination of a lock bar suspended to swing on any one of several axes, a key adapted to cause the lock bar to change axes, a companion lever having a lost motion coupling with said key, a hook portion on said companion lever adapted to engage over the lock bar and prevent overthrow of the bar, the said companion lever being adapted by reason of said lost motion coupling to delay the actuation of the lock bar until change of axes is effected, substantially as described.

5. In a cash register, the combination of a key, a companion lever, pivotally connected with said key, a pin and slot connection controlling the relative movement of the key and companion lever, a shaft suspended to oscillate on a center eccentric to its own axis, a lock bar oscillatory on said shaft and adapted to be actuated by said key and companion lever, a segmental rack connected with and actuated by said lock bar, a register pinion, a retaining pawl for the register pinion, and means controlling the oscillatory shaft, for oscillating it and thereby throwing the rack into and out of engagement with the register pinion, substantially as described.

6. In a cash register, the combination of a key shaft, keys oscillatory thereon, companion levers for each key, oscillatory on said shaft and coupled with each key by a lost motion coupling, a registering pinion, a rack for actuating said pinion, the said keys being adapted to actuate the rack, connections between the rack and keys for throwing the rack into and out of mesh with the pinion, the said companion lever by reason of the lost motion coupling being adapted to delay actuation of the rack upon the return stroke of the key until the rack is disengaged from the pinion, substantially as described.

7. In a cash register, a key, a lock bar and segmental rack attached thereto, a companion lever to said key adapted to engage with said lock bar, a common shaft upon which key and companion lever are pivoted and a pin and slot connection between the key and lever, substantially as described.

8. In a cash register, the combination of keys, a registering pinion, a fixed bar, a segment supporting shaft, hangers swingingly suspending the same from the fixed bar, a segmental rack pivoted to the segment-supporting shaft, a lock bar fast to the rack, means for transferring the oscillatory movement of the keys into continuous rotary movement, a rotary cam, a link connected with said segment-supporting shaft, the said link being reciprocated by the rotary cam at properly timed intervals for bringing the rack into and forcing it out of engagement with the registering pinion, substantially as described.

9. In a cash register, the combination of keys, a registering pinion, a fixed bar, a segment-supporting shaft, hangers by which said shaft is swingingly depended from the fixed bar, a rack pivoted to the shaft, a lock bar fast to the rack and adapted to oscillate the same, the said keys being adapted to rock the lock bar, connections between the key and segment-supporting shaft for throwing the rack in and out of engagement with the registering pinion, and means for delayed actuation of the lock bar upon the return stroke of the key to allow for the disengagement of the rack from the registering pinion, substantially as described.

10. In a cash register, the combination of keys, a counter wheel actuating lock bar suspended to swing on any one of several axes, and actuated one way by said keys, means for transferring the oscillatory movement of the keys into continuous rotary movement, a rotary cam, a link connected with said lock bar for shifting its axes of swinging, the said link being actuated by said rotary cam, substantially as described.

11. In a cash register, the combination of keys, a register wheel actuating lock bar, a companion lever for each key having a common pivoting with the keys and having a lost motion coupling with the key for delayed return actuation of the lock bar and provided with a hooked portion adapted to prevent overthrow of the lock bar, substantially as described.

12. In a cash register, the combination of keys, a counter wheel actuating lock bar, a companion lever for each key having a lost motion coupling with the key for delayed return actuation of the lock bar, the said keys being provided with different cam faces for variant registerable values and the companion levers being provided with hooked portions for preventing overthrow of the lock bar, substantially as described.

13. In a cash register, the combination of indicator rods, a key coupler, a lateral slot therein, a plurality of keys provided with projecting terminals for operating the indicator rods and for engagement with stops to limit the stroke of the key, projections for engagement with the lateral opening in the key coupler, cam faces on the keys between the projecting terminal and the second mentioned projection arranged to give different actuation for variant values, substantially as described.

14. In a cash register, in combination a key having a graduated cam surface, a companion lever, a unitary pivot for said key and companion lever, a lock bar actuated by said key, and engaging between said key and a bearing part of said companion lever, and an abutment adapted to engage the companion lever and the key, substantially as described.

15. In a cash register the combination of a plurality of keys provided with upper cam surfaces variant for different values, a counter wheel actuating lock bar engaged by said cam surfaces, and a separate companion lever for preventing overthrow of the lock bar, substantially as described.

16. In a cash register the combination of a plurality of keys provided with upper cam surfaces variant for different values, with a counter wheel actuating lock bar engaged by said cam surfaces and a separate companion lever for preventing overthrow of the lock bar and for delaying the return actuation thereof after the key has started on its return stroke, substantially as described.

17. In a cash register, the combination of a key shaft, keys oscillatory thereon, a companion lever for each key having a lost motion coupling therewith and oscillatory on said shaft, a registering pinion, a rack for actuating said pinion, the said keys and companion levers being provided with cam surfaces adapted to actuate the rack different distances for variant values, connections between the rack and keys for throwing the rack in and out of mesh with the pinion, the said companion lever by reason of the lost motion coupling being adapted to delay actuation of the rack upon the return stroke of the key until the rack is disengaged from the pinion, substantially as described.

18. In a cash register, the combination of a key shaft, keys oscillatory thereon, a companion lever for each key oscillatory on said key shaft and coupled with each key by a lost motion coupling, a registering pinion, a rack for actuating said pinion, the said keys being provided with cam surfaces adapted to actuate the racks different distances for variant values, connections between the rack and keys for throwing the rack in and out of mesh with the pinion, the said companion lever by reason of the lost motion coupling being adapted to delay actuation of the rack upon the return stroke of the key until the rack is disengaged from the pinion, substantially as described.

19. In a cash register, a key provided with an indicator rod engaging extension and a key coupler engaging extension, a lock bar actuated by said key, a companion lever for delayed return actuation of said lock bar, provided with an extension adapted to engage the lock bar, the lock bar engaging between the indicator rod engaging extension and the key coupler engaging extension and within the extension on the companion lever, substantially as described.

20. In a cash register, keys provided with indicator rod engaging extensions and key coupler engaging extensions and intervening graduated contact surfaces representing different values, a lock bar actuated by the contact surfaces of the keys, companion levers for delayed return actuation of said lock bar, said companion levers being provided with an extension adapted to engage the lock bar, the lock bar engaging between the indicator rod engaging extension and the key coupler engaging extension and within the extension on the companion lever, substantially as described.

21. In a cash register, having a plurality of keys, a universal key lock, comprising an oscillatory slotted tubular member arranged to engage a projection of a key entering the slot and interlock with the same, substantially as described.

22. In a cash register, having a plurality of keys, a projection from each key, an oscillatory slotted tubular member having the slot arranged in the travel path of said projection, and adapted to oscillate with the projection engaging through said slot, substantially as described.

23. In a cash register having a plurality of keys, a projection from each key, an oscillatory slotted tubular member having the slot arranged in the travel path of the projection, and adapted to oscillate with the projection engaging through the slot, the body of the coupler moving into the travel path of all unactuated keys, substantially as described.

24. In a cash register, the combination of a plurality of pivoted keys provided with projections and an oscillatory key coupler having a lockout portion the shape of a part-cylinder and slotted, the said slot being arranged immediately in the initial travel path of the projections of the keys, substantially as described.

25. In a cash register, the combination of a plurality of pivoted keys provided with projections and an oscillatory key coupler provided with a slot for the reception of the projections, the said slot being arranged immediately in the initial travel path of the projections of the keys, substantially as described.

26. In a cash register, the combination of a plurality of pivoted keys provided with forwardly extending projections on their rear arms and an oscillatory key coupler forward of said projections and having a slot for the reception of the projections that is arranged immediately in the initial path of the projections, substantially as described.

27. In a cash register, a plurality of pivoted keys, having forwardly extending projections on their rear arms, a key coupler forward of said projections and having a lockout portion that is slotted, the said slot being adapted to lie directly in front of and in the path of travel of the projections, the said projections being shaped to lie as close to the key coupler as possible without interfering with its oscillation by such key as is coupled with it, substantially as described.

28. In a cash register, the combination of a plurality of pivoted keys having forwardly extending projections on their rear arms, a key coupler forward of said projections and having a lockout portion the shape of a portion of a tube, the said lockout portion being slotted, the said slot being adapted to lie directly in front of and in the path of travel of the projections, the said projections being shaped to lie as close to the key coupler as is possible without interfering with its oscillation by other keys, substantially as described.

29. In a cash register, the combination of a grid provided with guide slots, pivoted keys provided with projections slidable in the slots and provided with second projections for interlocking with the key coupler, an oscillatory key coupler provided with a lockout portion having a slot immediately in the path of the initial travel of the projections on the keys and disk hangers on the grid for preventing more than one key of a bank of keys starting at the same time, the said disk hangers being made possible by the quick lockout feature of the key coupler and projections, substantially as described.

30. In a cash register, the combination of a plurality of keys having projections, an oscillatory key coupler having a lockout portion that is a portion of a tube and is slotted for the reception of the projections of the keys, the said projections of the keys and the tubular portion of the key coupler being arranged so that the projections of the keys upon movement almost immediately cross the circle of movement of the key coupler and lock therewith, substantially as described.

31. In a cash register, the combination of indicator rods, claws thereon, an indicator supporter provided with a slot adapted to hold the uplifted claws therein, and single means for oscillating said supporter at predetermined periods to force the uplifted claw down and catch the succeeding lifted claw and indicator rod, substantially as described.

32. In a cash register, a rotary shaft, a rotary cam carried thereby, an indicator, a claw thereon, an indicator supporter adapted to force the uplifted claw down and catch the succeeding uplifted claw and linkage between said supporter and the cam adapted to operate the indicator supporter at determined intervals, substantially as described.

33. In a cash register, the combination of indicator rods, claws thereon, an indicator supporter adapted to hold the uplifted claw and when oscillated force the same down and catch the succeeding uplifted claw, and positive means for oscillating the supporter at determined periods, substantially as described.

34. In a cash register, the combination of value keys having two cycles of motion, a frame rotatable on one of several axes, lost motion mechanism coöperating with the frame and the value key, the lost motion mechanism being effective to rotate the frame only in unison with the value key during the first cycle of movement of the value key.

35. In a cash register, the combination of locking mechanism, a key coupler, carrying pawls having an operative connection therewith, a member operated by the locking mechanism and adapted to lock the key coupler and hence the pawls, when the locking mechanism is turned, and a flash operated by said member, substantially as described.

36. In a cash register, the combination of a value key having two cycles of movement, a frame rotatable on one of several axes, lost motion mechanism coöperating with the frame and the value key, the lost motion mechanism being effective to prevent the rotation of the frame during a certain period of the second cycle of the key.

37. In a cash register, the combination of locking mechanism, a shaft upon which the counters are located, a segmental disk fast on said shaft, a key coupler provided with a notch, an angled rock arm operated by the locking mechanism and, when the locking mechanism is turned one way, adapted to prevent the rotation of the shaft by engaging against the segmental disk and, when the locking mechanism is turned the other way, adapted to allow the rotation of the shaft, but adapted to lock the key coupler by engagement in said notch, a flash operated by the movement of said angled rock arm, carrying pawls, and positive operative connections between the carrying pawls and key-coupler whereby, when the key coupler is locked, the carrying pawls are locked against movement, substantially as described.

38. In a cash register, the combination of locking mechanism, a shaft upon which the counters are located, a segmental disk fast on said shaft, a key-coupler provided with a notch, an angled rock arm operated by the locking mechanism and, when the locking mechanism is turned one way, adapted to prevent the rotation of the shaft by engagement against the segmental disk and, when the locking mechanism is turned the other way, adapted to allow the shaft to turn but adapted to lock the key coupler by engaging in said notch, carrying pawls and positive operative connections between the carrying pawls and key couplers whereby, when the key coupler is locked, the carrying pawls are locked against movement, substantially as described.

39. In a cash register, the combination of locking mechanism, a shaft upon which the counters are located, a segmental disk fast on said shaft, a key coupler provided with a notch, an angled rock arm operative by the locking mechanism and, when the locking mechanism is turned one way, adapted to prevent the rotation of the shaft by engagement against the segmental disk and, when the locking mechanism is turned the other way, adapted to allow the shaft to turn but adapted to lock the key coupler by engaging in said notch, substantially as described.

40. In a cash register, the combination of locking mechanism, a shaft upon which the counters are located, a key coupler, a member operated by the locking mechanism and, when the locking mechanism is turned one way, adapted to prevent the rotation of the shaft, and when the locking mechanism is turned the other way, adapted to allow the shaft to turn but to lock the key-coupler from oscillation, and carrying pawls operated by the key coupler and locked from movement by the key coupler being locked, substantially as described.

41. In a cash register, the combination of locking mechanism, a shaft upon which the counters are located, a key coupler, and a member operated by the locking mechanism and, when the locking mechanism is turned one way, adapted to prevent the rotation of the shaft, and when the locking mechanism is turned the other way adapted to allow the shaft to turn but to lock the key coupler from oscillation, substantially as described.

42. In a cash register, the combination of locking mechanism, a shaft upon which the counters are located, a segmental disk fast on said shaft, a key coupler provided with a notch, an angled rock arm operated by the locking mechanism and, when the locking mechanism is turned one way, adapted to prevent the rotation of the shaft by engagement against the segmental disk and, when the locking mechanism is turned the other way, adapted to allow the shaft to turn but adapted to lock the key coupler by engaging in said notch, and a flash operated by the movement of said angled rock arm, substantially as described.

43. In a cash register, the combination of a lock bar and a register actuating segmental rack, of a pivoted key having an auxiliary arm attached thereto, said auxiliary arm carrying a deep notch, adapted to engage with the lock bar to actuate the segmental rack, and by reason of said deep notch to prevent overthrow of the lock bar, substantially as described.

44. In a cash register, the combination of a lock bar and a register actuating segmental rack, of a pivoted key carrying an auxiliary arm loosely attached thereto, said auxiliary arm having a deep notch and the walls of said arm arranged so that when the lock bar engages in the notch for the key to actuate the rack, the said walls preventing the overthrow of the lock bar, substantially as described.

45. In a cash register, the combination with a register pinion, a lock bar and a register actuating segmental rack, the lock bar and segmental rack being adapted to swing in and out of engagement with the register pinion, of a key provided with a deep notch to prevent overthrow of the lock bar and with a side notch near the bottom of said first mentioned notch for allowing the lock bar to swing slightly so that the segmental rack may swing away from the register pinion when disengagement of these members is desired, substantially as described.

In testimony whereof, I sign this specification in the presence of two witnesses.

JOSEPH P. CLEAL.

Witnesses:
CHARLES F. BURTON,
VIRGINIA C. SPRATT.